Patented Aug. 2, 1949

2,477,655

UNITED STATES PATENT OFFICE 2,477,655

CONDENSATES OF ROSIN WITH UNSATURATED HETEROCYCLICS

Alfred L. Rummelsburg, Wilmington, Del., assignor to Hercules Powder Company, Wilmington, Del., a corporation of Delaware No Drawing. Application May 21, 1946, Serial No. 671,393

9 Claims. (Cl. 260—97)

This invention relates to resinous condensation products of rosin with unsaturated heterocyclic compounds and to esters of said condensation products and to varnish compositions containing them.

Rosin has long been known to be deficient alone or in the form of its esters for use in varnishes, particularly because of its softness and poor bodying characteristics. Polymerization of rosin has been one means practiced by the art to overcome such deficiencies. By polymerization of rosin some improvement has been obtained but products which would be entirely satisfactory from the standpoint of bodying, drying and flexibility characteristics have not been produced by polymerization alone.

In accordance with this invention, it has been found that rosin may be condensed with unsaturated heterocyclic compounds to form novel resinous condensation products which may be esterified, the condensation products more particularly in the form of their esters exhibiting the desired improvement in bodying, drying and flexibility characteristics when used in varnishes and other coating compositions.

More particularly, the condensation products of rosin with unsaturated heterocyclic compounds of this invention are resinous products obtained by condensing a rosin with an unsaturated heterocyclic compound which is capable of self-polymerization to a hemicolloid with or without a condensation catalyst at temperatures within the range of about −10° C. to about 350° C. depending upon the particular materials being condensed and other factors.

The conditions for effecting the condensation of rosin with the unsaturated heterocyclic compounds are more specifically set forth in the following examples. Unless otherwise noted all weights are parts by weight.

EXAMPLE 1

To a solution of 100 parts wood rosin in 150 parts of benzene was added 41 parts of a coumarone distillation cut of solvent naphtha boiling at 111° C. (100 mm.) $n_D^{20}$ 1.55855, bromine number 109 (81% active ingredient). To this solution was added boron trifluoride gas with external cooling and stirring to keep the temperature below about 60° C. over a period of 11 minutes during which time 2 parts boron trifluoride was absorbed. The homogeneous reaction mixture was allowed to cool to room temperature (20° C. to 30° C.) and stand for 4 hours. The catalyst was then removed by washing at 50° C. to 60° C. with warm water. The benzene solvent was removed by distillation at 20 to 300 mm. using an oil bath heated up to 190° C. The yield of rosin condensate amounted to 134 parts. It had the following analysis: acid number 114, drop melting point 140° C., 9.9% unsaponifiable constituents. From the weight of the condensate it is calculated that the rosin-coumarone condensate contains about 0.88 mole of coumarone per mole rosin. The condensate is soluble in benzene, gasoline, ether, and alcohol.

Examples 2 to 7 were carried out in a similar manner. The data on the condensation and characteristics of the rosin condensates are set forth in Table I. The rosins used were pale wood rosins.

Table I

| Example | Unsaturated Heterocyclic Compound | Reactants | | Reaction Conditions | | | | | | Products | | | | |
|---|---|---|---|---|---|---|---|---|---|---|---|---|---|---|
| | | Weight Heterocyclic Compound | Weight Rosin | Catalyst | Weight Catalyst | Solvent | Weight Solvent | Time, minutes | Temperature, °C. | Weight | Acid Number | Drop Melting Point | Unsaponifiable Content | Molecular Weight |
| 1 | Coumarone (B.P. 111° C./100 mm.) $n_D^{20}$ 1.55855 | 41 | 100 | BF₃ | 2 | Benzene | 150 | 240 | 20–30 | 134 | 114 | 140 | 9.9 | |
| 2 | Coumarone (30%) | 680 | 600 | ---do--- | 12 | ---do--- | 1,540 | 210 | 15–25 | 985 | 99.5 | 158 | 8.7 | |
| 3 | Furane | 25 | 200 | ---do--- | 7 | ---do--- | 500 | 220 | 25–30 | 219 | 146 | 154 | | 569 |
| 4 | Thiophene | 37 | 150 | ---do--- | 3 | ---do--- | 225 | 240 | 25–30 | 167 | 148 | 137 | 5.2 | 498–523 |
| 5 | Pyrrole | 22 | 200 | ---do--- | 6 | ---do--- | 300 | 240 | 25–30 | 194 | 158 | 98 | | |
| 6 | Coumarone $n_D^{20}$ 1.55855 | 200 | 200 | H₂SO₄ [1] | 100 | ---do--- | 400 | 90 | 15–20 | 355 | 84 | 104 | 20.2 | |
| 7 | Coumarone $n_D^{20}$ 1.55855 | 31 | 100 | None | | Isooctane | 100 | 360 | 230–240 | 120 | 138 | 87 | 13.1 | |

[1] 95%.

The rosins which are used are those having ethylenic unsaturation, such as the natural rosins of the type of wood and gum rosin, and treated rosins such as heat-bleached, heat-treated, and isomerized rosins.

The unsaturated heterocyclic compounds used are those which are capable of selfpolymerization to hemicolloids; i. e., to polymers having at least 20 to 100 units per polymer molecule. Heterocyclic compounds of this type and suitable for use in this invention are compounds having oxygen, sulfur, or nitrogen in the heterocyclic ring such as coumarone, furane, thiophene, pyrrole, indole, skatole, and vinyl pyridine. Mixtures of any of these compounds may be used.

The molecular ratio of rosin to unsaturated heterocyclic compound in the condensation may vary from about 0.1 to 20. Any unreacted heterocyclic compound remaining may be removed from the condensation product as for example by distillation.

Where a catalyst is desired, any of the well-known condensation catalysts may be used such as the Friedel-Crafts type catalysts including boron trifluoride, complexes of boron trifluoride with ethers and organic acids, halides of metals whose hydroxides are amphoteric, such as aluminum chloride, zinc chloride, stannic chloride, titanium tetrachloride, etc., and mineral acid condensation catalysts such as hydrofluoric acid, fluoroboric acid, sulfuric acid, and phosphoric acid. The Friedel-Crafts type catalysts are preferred.

When a catalyst is used for the condensation, a temperature range varying from as low as $-50°$ C. to as high as $150°$ C. may be used. Ordinarily, temperatures from about $0°$ C. to about $60°$ C. are preferred with boron trifluoride catalysts while with zinc chloride the preferred temperature range is $100°$ C. to $140°$ C. When no catalyst is used a somewhat higher temperature is desirable as from about $125°$ C. to about $350°$ C. and preferably from about $150°$ C. to about $275°$ C.

Inert solvents may be used to improve the fluidity of the reactants and to facilitate dispersion of the catalyst. Satisfactory solvents are aromatic solvents such as benzene, xylene, and the like; hydrocarbon solvents such as cyclohexane and benzene hydrocarbons, and halogenated solvents such as carbon tetrachloride and ethylene dichloride. Similar solvents may be used in carrying out the reaction in the absence of a catalyst.

The rosin condensates of this invention are stabilized resinous materials having decreased tendency to absorb oxygen. Moreover, they are generally higher melting than rosin and are believed to be true condensates as indicated by the low unsaponifiable content. The preferred products of this invention have an unsaponifiable content not substantially greater and melting points substantially higher than those of the rosins from which they are made. They are characterized by solubility in aromatic, paraffinic and olefinic hydrocarbons, turpentine and drying oils. In general, their solubility in the lower alcohols is somewhat diminished, but increases with the molecular weight of the alcohol.

The rosin condensates appear to be high molecular weight carboxylic acids containing one or more resin acid nucleus per molecule, depending upon the number of active unsaturated centers in the heterocyclic compound used. Furane, thiophene, and pyrrole, for example, each appear to have to some degree two active centers of unsaturation. Thus, the products therefrom appear to contain polybasic acids varying in amount depending upon the heterocyclic compound used. Moreover, the condensate appears to be a mixture of monocarboxylic acids and polycarboxylic acids depending upon the conditions used in effecting the condensation. The preferred condensates of this invention are those having an average molecular weight between about 350 and 1000. The condensation products containing various ratios of resin acid to heterocyclic compound are prepared by varying the amount of unsaturated heterocyclic compound added in the condensation and by controlling the rate of condensation.

The esters of the condensation products of rosin with unsaturated heterocyclic compounds may be prepared by heating with the desired alcohol at temperatures within the range of about $200°$ C. to about $350°$ C. with or without catalysts such as zinc and calcium salts.

The method of preparing the esters of the condensation products of rosin with unsaturated heterocyclic compounds of this invention may be illustrated by the following example.

In a vessel fitted with a steam-jacketed condenser and a thermometer was placed 600 parts coumarone-rosin condensate, melting point $158°$ C., prepared according to Example 2, Table I, along with 10 parts high-test glycerin. The mixture was heated to $200°$ C. in 70 minutes and then 30.7 parts glycerin gradually added over a period of 1 hour and 55 minutes while the temperature was raised to $250°$ C. The temperature was then raised to $270°$ C. where it was held for $11\frac{1}{2}$ hours at which time the acid number of 10.3 was obtained. The material was then sparged vigorously for 45 minutes with carbon dioxide gas to drive off unreacted glycerin and oils. The resin thus obtained had an acid number of 10.3 and a drop melting point of $169°$ C. The ester was soluble in drying oils and in varnish solvents.

The alcohols from which the esters of this invention may be made include the aliphatic monohydric alcohols such as methyl alcohol, ethyl alcohol, propyl alcohol, and butyl alcohol and the polyhydric alcohols such as ethylene glycol, propylene glycol, polyethylene glycol, trimethylene glycol, glycerin, sorbitol, mannitol, pentaerythritol, and dipentaerythritol. The polyhydric alcohol esters are hard resinous materials having decreased tendency to absorb oxygen and having in general melting points higher than the corresponding rosin esters. If desired, esters may likewise be prepared directly by use of a rosin ester in the condensation reaction. Mixed esters of the condensation products may be produced by esterification in admixture with other acidic materials as drying oil fatty acids.

Varnishes may be produced from the condensation products of this invention or their esters by customary varnishmaking technique with use of any of the well-known drying oils such as linseed oil, tung oil, dehydrated castor oil, soya oil, fish oil, sunflower seed oil, rapeseed oil, perilla oil, oiticia oil, hemp seed oil, and dissolving in a solvent. Driers are preferably added.

A varnish made by heating 200 parts coumarone-rosin condensate (drop melting point $158°$ C.) and 352 parts bodied tung oil at $565°$ F. for 15 minutes and quickly cooled by adding 48 parts Z3 (Gardner-Holdt viscosity scale) linseed oil and diluted to 50% solids with mineral spirits had a viscosity D (Gardner-Holdt scale). After 2% lead and 0.03% cobalt (based on solids content) in the form of naphthenate driers were added the varnish obtained showed fast drying characteristics together with excellent flexibility and excellent water and alkali resistance.

The compositions of this invention can thus be made into oleoresinous varnishes having bodying characteristics and drying characteristics superior to those prepared from rosin or polymerized rosin and whose varnish films have greater water resistance, flexibility, and stability toward oxidation.

What I claim and desire to protect by Letters Patent is:

1. A new composition of matter comprising a resinous material selected from the group consisting of a condensation product of rosin with an unsaturated heterocyclic compound containing only carbon, hydrogen, and the hetero-atom, which is capable of selfpolymerization to a hemicolloid and aliphatic esters of said condensation product, the molar ratio of rosin to heterocyclic compound in the condensate being from about 0.1 to 20.

2. A new composition of matter comprising a resinous material selected from the group consisting of a condensation product of rosin with coumarone and aliphatic esters of said condensation product, the molar ratio of rosin to coumarone in the condensate being from about 0.1 to 20.

3. A new composition of matter comprising a resinous material selected from the group consisting of a condensation product of rosin with furane and aliphatic esters of said condensation product, the molar ratio of rosin to furane in the condensate being from about 0.1 to 20.

4. A new composition of matter comprising a resinous ester of an aliphatic polyhydric alcohol and a condensation product of rosin with an unsaturated heterocyclic compound containing only carbon, hydrogen, and the hetero-atom, which is capable of selfpolymerization to a hemicolloid, the molar ratio of rosin to heterocyclic compound in the condensate being from about 0.1 to 20.

5. The method of producing a stabilized resinous material which comprises condensing rosin with an unsaturated heterocyclic compound containing only carbon, hydrogen, and the hetero-atom, which is capable of selfpolymerization to a hemicolloid, the molar ratio of rosin to heterocyclic compound being from about 0.1 to 20.

6. A coating composition comprising a resinous material selected from the group consisting of a condensation product of rosin with an unsaturated heterocyclic compound containing only carbon, hydrogen, and the hetero-atom, which is capable of selfpolymerization to a hemicolloid and aliphatic polyhydric alcohol esters of said condensation product, the molar ratio of rosin to heterocyclic compound in the condensate being from about 0.1 to 20 and a volatile petroleum hydrocarbon solvent in an amount which will yield a readily flowing mixture capable of application in a thin film.

7. A coating composition comprising a resinous material selected from the group consisting of a condensation product of rosin with an unsaturated heterocyclic compound containing only carbon, hydrogen, and the hetero-atom, which is capable of selfpolymerization to a hemicolloid and aliphatic polyhydric alcohol esters of said condensation product, the molar ratio of rosin to heterocyclic compound in the condensate being from about 0.1 to 20; a drying oil; and a volatile petroleum hydrocarbon solvent in an amount which will yield a readily flowing mixture capable of application in a thin film.

8. The method of producing an ester of a resinous condensation product of rosin with an unsaturated heterocyclic compound containing only carbon, hydrogen, and the hetero-atom, which comprises heating said condensation product with an aliphatic alcohol at a temperature within the range of about 250° C. to about 325° C.

9. The method of producing a stabilized resinous material which comprises condensing rosin with an unsaturated heterocyclic compound containing only carbon, hydrogen, and the hetero-atom, which is capable of selfpolymerization to a hemicolloid in the presence of a condensation catalyst at a temperature of from about −50° C. to about 150° C., the molar ratio of rosin to heterocyclic compound being from about 0.1 to 20.

ALFRED L. RUMMELSBURG.

REFERENCES CITED

The following references are of record in the file of this patent:

UNITED STATES PATENTS

| Number | Name | Date |
|---|---|---|
| 2,052,073 | Binapfl | Aug. 25, 1936 |
| 2,346,416 | Cline | Apr. 11, 1944 |
| 2,354,776 | Rummelsburg | Aug. 1, 1944 |